United States Patent Office 3,755,561
Patented Aug. 28, 1973

3,755,561
BACTERICIDAL CONTACT LENS SOLUTION
Billy F. Rankin, Rockville, Md., assignor to Burton, Parsons & Company, Inc., Washington, D.C.
No Drawing. Continuation-in-part of application Ser. No. 44,564, June 8, 1970. This application Mar. 22, 1971, Ser. No. 127,002
Int. Cl. A61k 17/00
U.S. Cl. 424—78                 6 Claims

ABSTRACT OF THE DISCLOSURE

A composition is provided for employment with gel-type contact lenses, which contains no component which will become entrained in the lattice of the gel, and yet provides a durable bactericidal action for the lens and is compatible with ocular tissues. The composition comprises an aqueous solution of polyvinyl pyrrolidone and a polyalkylene glycol plasticizing humectant and up to about 1 part in 50,000, preferably not more than about 1 part in 100,000 of thimerosal.

---

This application is a continuation-in-part of applicant's copending application Ser. No. 44,564, filed June 8, 1970.

This invention relates to contact lens treating compositions, and more particularly to a bactericidal contact lens solution for use with gel-type contact lenses. Specifically, this invention is directed to a composition which provides bactericidal activity, can readily penetrate the gel-type lens, and which contains no component which can accumulate in the matrix of the gel.

The advent of the gel contact lens has generated entirely new requirements for contact lens treating solutions, and entirely new problems in hygenic handling and care for the lenses. In contrast to the more common hard-type lens, usually made of polymethylmethacrylate, the gel lens will absorb relatively large proportions of water to form a soft, pliable material which has a tendency to fray. The gel is a three-dimensional lattice formed by the polymerization of glycol esters and diesters of acrylic acids. The glycol moieties of the molecules imparts a strong hydrophilic character to the lattice, with the consequent ability to absorb large amounts of water. By utilizing the unique properties of these lenses, new therapeutic options are presented for the treatment of ocular debilities. Since the lens, per se, represents only the environment of use of the composition, a complete discussion of its physical parameters need not be repeated here. A discussion of the gel contact lens, including both the preparation and use thereof, occurs in Augen Optiker, Heft 6/1964, pp. 5, 6, which reports a paper delivered by Maximillian Dreifus at the Fifteenth W.V.E.A. Annual Meeting. See also, for example, U.S. Pats. Nos. 2,976,576 and 3,220,960. Actual lenses currently being marketed include The Bionite Lens of Griffin Laboratories, Buffalo, N.Y.; the Hydron Lens of Bausch & Lomb Company, Philadelphia, Pa.; and the continuous curve contact lens of the Kontoor Kontact Lens Company of Richmond, Calif.

One characteristic peculiar to the gel lens is the requirement that treating solutions contain components that are minimally entrained in the gel lattice, since some materials found satisfactory for hard contact lenses tend to accumulate and become irritating to the ocular tissues. The lens does, however, require treating solutions to avoid irritation of the ocular tissues. In addition to the avoidance of materials which can accumulate in the gel, the materials used must be compatible with the gel and with ocular tissue, and not interfere with the physiochemical balance of the precorneal films. Among the treating solutions employed in conjunction with gel-type lenses, there can be mentioned lubricating and cushioning solutions, and synthetic mucus and/or tear compositions.

An additional problem which has been observed with the use of gel type contact lenses is the entrainment and accumulation in the lattice of the gel of bacteria. The lens is exposed to a number of species of bacteria in the ordinary course of wear, and the organisms in some instances surface cover the lens and also penetrate the matrix and become entrained and accumulate therein; frequently being able to reproduce in this environment. Bacterial growths within or on the lens present obvious problems and dangers of infections of the ocular tissues, and, in addition, can, in extreme circumstances, alter the optical properties of the lens. As a result, it has been usual to include biocidal components in the various solutions and compositions employed with gel-type lenses, but such materials in large amounts can also be entrained in the gel matrix and accumulate in some instances to the point where they become an irritant to ocular tissues themselves.

It is accordingly an object of the present invention to provide a bactericidal lens treating solution containing components which provide minimal entrainment in the gel matrix, which is compatible with the gel, and with ocular tissues, and which does not interfere with the precorneal film.

These and still other objects, apparent from the following disclosure, are realized by the composition of the present invention. It has been found that an aqueous solution of polyvinyl pyrrolidone and a polyalkylene glycol provides a contact lens solution with bactericidal activity to the species of bacteria to which the gel lens is most susceptible of exposure. In such a context, minor amounts of a biocide, such as thimerosal or the like, can be employed in such reduced concentrations that no danger of undue entrainment results.

Polymers of vinyl pyrrolidone are widely available commercially, and any convenient member of this class of commercial polymers is readily usable in the present invention. An example is Plasdone C, supplied by Entira Chemicals, division of G.A.F. Corporation. Said polymers are prepared by conventional addition polymerization techniques, which are well known to the art and form no part of the present invention.

Along with the polyvinyl pyrrolidone, a polyalkylene glycol is included in the composition to provide enhanced fluid retention and a plasticizing affect. The preferred polyalkylene glycol is polyethylene glycol, such as any of the carbowax materials, i.e., Carbowax 200–Carbowax 6000, inclusive, as supplied by Carbide and Carbon Chemicals Company. Still other polyalkylene glycols, such as polypropylene glycol, and the like, can also be employed. While other alkylene groups can be included in the glycol, the lower alkylene glycols and particularly polyethylene glycol, are preferred, primarily because of their great availability.

The polyvinyl pyrrolidone and polyethylene glycol are included in an aqueous solution, wherein the polyvinyl pyrrolidone is present in an amount corresponding to about 0.05–3.0 weight percent, and the polyethylene glycol is included in an amount of about 0.05–5.0 weight percent, based on the weight of the total composition.

While the solution of polyvinyl pyrrolidone and polyalkylene glycol is per se an active biocide, the biocidal activity is not alone sufficient for most normal usage. It is possible, however, to utilize the solution as the basis for an improved formulation of a soluble biocide, such as, preferably, thimerosal, a product of Eli Lilly or other similar known water soluble biocides, such as phenyl mercuric nitrate. In the biocidal solution, far lower concentrations of the biocide are required in order to attain exceptional levels of biocidal activity. While such biocides are ordinarily employed in concentrations of at least about 0.01 weight percent, and more frequently at levels of at least about 0.1 weight percent, it has now been found that 1 part by weight in 50,000 parts of the solution have equivalent activity to the higher levels of usage, and for most applications, a concentration of 1 part in 100,000 parts of solution is satisfactory. While the operation of the biocide in the context of the present invention is not completely understood, it has been observed that a synergism results when the mildly biocidal solution and the soluble biocide are combined. The result is that the concentration of the biocide can be reduced to levels at which entrainment in the gel lens matrix no longer occurs, to any significant degree without loss of its effectiveness in eliminating or controlling bacteria.

While the foregoing components are fundamental to the composition of the present invention, it can be desirable and possible to include still other materials in the bactericidal composition, keeping in mind, of course, that they must be in a form which will not become entrained or be accumulated in the gel lens. Preferably, these materials should be in a form which would be retained readily in solution in the aqueous composition. Such materials can include, for example, medicaments, preservatives, coloring agents, perfumes, surfactants, intoxicants, and the like.

The composition of the present invention can be varied to suit the particular requirements of use, but a generally preferred, basic formualtion is illustrated in the following example, which accordingly should not be construed as limiting.

EXAMPLE

A germicidal test, using various dilutions of 24-hour cultures of *Bacillus subtilis, Candida albicans, Escherichia coli, Pseudomonas aeruginosa,* and *Staphylococcus* was conducted on a sterile solution of 0.5 weight percent polyvinyl pyrrolidone (plasdone C), and 0.5 weight percent of polyethylene glycol (Carbowax 4000). For each dilution of the cultures, 0.01 milliliter of each dilution was aseptically introduced into two milliliters of each increment of the solution, and after one hour and two hours, 0.01 milliliter of the innoculated solutions were aseptically transferred to 16 milliliters of a sterile thioglycolate media. The tubes were incubated at 32° C. for seven days. Corresponding control tubes for all dilutions were positive.

The following bacteria were used in the study:

*Bacillus subtilis*—laboratory strain
*Candida albicans*—American Type Culure Collection #10231
*Escherichia coli*—American Type Culture Collection #11775
*Pseudomonas aeruginosa*—American Type Culture Collection #10145
*Staphylococcus aureus*—American Type Culture Collection #6538

After the seven-day incubation period, the sterile media were examined for culture growth, the result of which is reported in the following table, wherein positive indicates the presence of active bacteria cultures, and negative indicates that no bacterial cultures were found.

In addition to the foregoing example, the eyes of ten rabbits were flooded with 5 milliliters of the solution of the example. Periodic inspection of the eyes of the test rabbits over a period of five hours disclosed no case of eye irritation resulting from the solution of the example.

The solution has been utilized by hundreds of actual gel lens wearers who generally experienced and reported full compatibility both with ocular tissue and vision requirements.

What is claimed is:

1. A method of treating a soft, pliable and water absorbing three-dimensional hydrophilic lattice-gel contact lens formed by the polymerization of glycol esters and diesters of acrylic acids which tend to entrain and accumulate bacteria in the ordinary course of wear, which comprises the step of placing said lens in an aqueous contact lens treating solution with bactericidal activity, consisting essentially of:

(a) about 0.05–3.0 weight percent polyvinyl pyrrolidone, and
   (b) about .05–5.0 weight percent of a polyalkylene glycol having a molecular weight of about 200–6,000, said solution containing sufficient effective bactericidal amounts of (a) and (b), to eliminate or control the species of bacteria to which the gel lens is most susceptible to exposure, including particularly *Bacillus subtilis, Candida albicans, Escherichia coli, Pseudomonas aeruginosa, Staphylococcus aureus,* said effective amount being insufficient to exhibit entraining accumulation and ocular tissue irritation in the gel matrix, said solution optionally further containing soluble forms of other biocides and other medicaments, preservatives, coloring agents, perfumes, surfactants, detoxicants, and the like which do not penetrate into and become entrained into and accumulate in the matrix of the gel lens in deleterious amounts.

2. The method of claim 1 wherein said solution further comprises up to about 1 part of thimerosal per 50,000 parts of said solution.

3. The method of claim 1 wherein said polyalkylene glycol is polyethylene glycol.

4. An aqueous contact lens treating solution with bactericidal activity, consisting of:

(a) about 0.05–3.0 weight percent polyvinyl pyrrolidone, and
   (b) about .05–5.0 weight percent of a polyalkylene glycol having a molecular weight of about 200–6,000, said solution containing sufficient effective bactericidal amounts of (a) and (b) to eliminate or control the species of bacteria to which the gel lens is most susceptible to exposure, including particularly *Bacillus subtilis, Candida albicans, Escherichia coli, Pseudomonas aeruginosa, Staphylococcus aureus,* said effective amount being insufficient to exhibit entraining accumulation and ocular tissue irritation in the gel matrix, said solution optionally further containing soluble forms of other biocides and other medicaments, preservatives, coloring agents, perfumes, surfactants, detoxicants, and the like which do not penetrate into and become entrained into and accumulate in the matrix of the gel lens in deleterious amounts.

5. The solution of claim 4 wherein said solution fur-

TABLE

| | *Bacillus subtilis* | | *Candida albicans* | | *Escherichia coli* | | *Pseudomonas aeruginosa* | | *Staphylococcus aureus* | |
|---|---|---|---|---|---|---|---|---|---|---|
| Dilution | 1 hr. | 2 hrs. | 1 hr. | 2 hrs. | 1 hr. | 2 hrs. | 1 hr. | 2 hrs. | 1 hr. | 2 hrs. |
| 1:10,000 | Negative | Negative | Positive | Positive | Negative | Negative | Positive | Positive | Negative | Negative. |
| 1:20,000 | do | do | do | do | do | do | do | do | do | Do. |
| 1:40,000 | do | do | do | do | do | do | Negative | Negative | do | Do. |
| 1:60,000 | do | do | do | Negative | do | do | do | do | do | Do. |
| 1:80,000 | do | do | Negative | do | do | do | do | do | do | Do. |
| 1:100,000 | do | do | do | do | do | do | do | do | do | Do. | ther comprises up to about 1 part of thimerosal per 50,000 parts of said solution.

6. The solution of claim 4 wherein said polyalkylene glycol is polyethylene glycol.

References Cited

UNITED STATES PATENTS

| | | | |
|---|---|---|---|
| 3,311,577 | 3/1967 | Rankin | 424—80 |
| 3,240,709 | 3/1966 | Rankin | 252—106 |
| 3,171,752 | 3/1965 | Rankin | 106—194 |
| 2,703,777 | 3/1955 | Feinstein et al. | 424—145 |
| 3,150,045 | 9/1964 | Boghosian | 424—78 |
| 3,183,152 | 5/1965 | Szekely et al. | 424—78 |
| 3,630,200 | 12/1971 | Higuchi | 128—260 |
| 3,618,604 | 11/1971 | Ness | 128—260 |

OTHER REFERENCES

Dabezies Eye, Ear, Nose & Throat Monthly, 45:82–4 March 1966 "Contact Lenses and Their Solutions."

Gasset et al., Amer. J. Ophthal. 69:252–9 February 1970, "Therapeutic Uses of Hydrophilic Contact Lenses."

Waltman et al., Investigative Ophthal., 9:250–5, April 1970, "Use of Hydrophilic Contact Lenses to Increase Ocular Penetration of Topical Drugs."

Sedlacek Ceskoslovenska of Thalmologie, 21:509–512 November 1965, "Possibilities of Application of Eye Drugs With the Aid of Gel Contact Lenses."

SHEP K. ROSE, Primary Examiner

U.S. Cl. X.R.

424—80